United States Patent
Greff

(10) Patent No.: US 12,458,671 B2
(45) Date of Patent: Nov. 4, 2025

(54) PRODUCT FOR THE TREATMENT OF DYSBIOSIS

(71) Applicant: Biopass, Luxembourg (LU)

(72) Inventor: Daniel Greff, Mere (FR)

(73) Assignee: BIOPASS, Luxembourg (LU)

(*) Notice: Subject to any disclaimer, the term of this patent is extended or adjusted under 35 U.S.C. 154(b) by 826 days.

(21) Appl. No.: 17/421,154

(22) PCT Filed: Jan. 13, 2020

(86) PCT No.: PCT/EP2020/050717
§ 371 (c)(1),
(2) Date: Jul. 7, 2021

(87) PCT Pub. No.: WO2020/144380
PCT Pub. Date: Jul. 16, 2020

(65) Prior Publication Data
US 2022/0080000 A1    Mar. 17, 2022

(30) Foreign Application Priority Data
Jan. 11, 2019    (FR) ...................... 1900279

(51) Int. Cl.
*A61K 35/741*    (2015.01)
*A61K 35/744*    (2015.01)
*A61K 47/10*    (2017.01)
*A61K 47/32*    (2006.01)
*A61P 17/04*    (2006.01)

(52) U.S. Cl.
CPC .......... *A61K 35/741* (2013.01); *A61K 35/744* (2013.01); *A61K 47/10* (2013.01); *A61K 47/32* (2013.01); *A61P 17/04* (2018.01)

(58) Field of Classification Search
CPC .... A61K 35/741; A61K 35/744; A61K 47/10; A61K 47/32; A61K 9/0014; A61K 9/08; A61K 31/78; A61K 35/74; A61K 31/047; A61P 17/04; A61P 17/06; A61P 17/08; A61P 17/10; Y02A 50/30
See application file for complete search history.

(56) References Cited

U.S. PATENT DOCUMENTS 9,962,402 B2 *   5/2018   Greff ................. A61P 17/00
2022/0080000 A1   3/2022   Greff

FOREIGN PATENT DOCUMENTS

| EP | 3908267 A1 | 11/2021 | |
|---|---|---|---|
| FR | 2703907 A1 | 10/1994 | |
| FR | 2879452 A1 | 6/2006 | |
| FR | 2913337 A1 | 9/2008 | |
| FR | 2918884 A1 | 1/2009 | |
| FR | 2918886 A1 | 1/2009 | |
| FR | 2973701 A1 | 10/2012 | |
| FR | 3091650 B1 | 2/2022 | |
| WO | WO 97/30692 | 8/1997 | |
| WO | WO 98/03152 | 1/1998 | |
| WO | WO 2012/136934 A2 | 10/2012 | |
| WO | WO-2016069396 A2 * | 5/2016 | ............. A61K 47/34 |
| WO | 20200144380 A1 | 5/2020 | |

OTHER PUBLICATIONS

Guéniche A, Hennino A, Goujon C, Dahel K, Bastien P, Martin R, Jourdain R, Breton L. Improvement of atopic dermatitis skin symptoms by Vitreoscilla filiformis bacterial extract. Eur J Dermatol. Jul.-Aug. 2006;16(4):380-4. PMID: 16935794. (Year: 2006).*
Gueniche et al., British Journal of Dermatology, 2008, vol. 159, p. 1357-1363.DOI 10.1111/j.1365-2133.2008.08836.x. (Year: 2008).*
Wikipedia—Topical medication, retrieved on Jul. 23, 2024, 11 pages of PDF. (Year: 2024).*
Lee et al., Ann Dermatol, 2016, vol. 28, No. 6, p. 690-696. doi:10.1038/nature09074. (Year: 2016).*
Wang et al., Appl Microbiol Biotechnol, 2014, vol. 98, p. 411-424. doi:10.1007/s00253-013-5394-8. (Year: 2014).*
International Preliminary Report on Patentability of International Application No. PCT/EP2020/050717 dated Jun. 16, 2021 (and English Translation), 14 pages.
https://www.cooper.fr/sites/default/files/NOTICE %2 (https://www.cooper.fr/osmosoft-150-g), Anonymous: "Osmo Soft Brûlures & Coups de soleil tube de 50 g ou de 150 g", Oct. 1, 2015, 1 page.
French Search Report of FR 1900279, Nov. 14, 2019, 3 pages.
International Search Report of International Application No. PCT/EP2020/050717 dated Mar. 31, 2020 (English Translation), 3 pages.
Office Action for France Patent Application No. 3,125,002, dated Jan. 16, 2025, 4 pages.

* cited by examiner

*Primary Examiner* — Kade Ariani
(74) *Attorney, Agent, or Firm* — Lippes Mathias LLP

(57) ABSTRACT

The disclosure relates to a product for topical use in the treatment of skin affected by dysbiosis. The product has a pH ranging from 5.5 to 6.5 and essentially includes water, glycerin and at least one crosslinked polyacrylate. This product can be used as a prerequisite for the transplantation of biological material favorable to the development of a healthy cutaneous bacterial flora.

20 Claims, No Drawings

PRODUCT FOR THE TREATMENT OF DYSBIOSIS

BACKGROUND OF THE DISCLOSURE

The present invention relates to a cosmetic or pharmaceutical product for the topical treatment of disorders or pathologies related to an imbalance of the skin microbiota.

PRIOR ART

The skin's surface is permanently colonized by a wide variety of microorganisms constituting the skin microbiota, including bacteria, yeasts and parasites. Dysbiosis, expressed as an imbalance between the different microorganism colonies, can result from an increase or a reduction in bacterial diversity, from the emergence of pathogenic bacteria or from a disturbance in the immune response. So-called commensal bacteria present in the resident flora have the function of protecting the host against infections triggered by the colonization of saprophytic microorganisms that have become pathogenic. Certain forms of eczema, for example, are triggered by these infections.

Eczema develops in flare-ups, with each flare-up consisting of four phases. The first, so-called erythematous phase is characterized by poorly defined red areas and itching. It is during this phase that itching is most intense. This first phase is followed by the vesicular phase. Vesicles appear on the erythematous lesions: they are transparent, contain clear serous fluid and may coalesce to form bullae. During a third, so-called oozing phase the vesicles rupture and then release a yellowish serous fluid which, when coagulated, covers the skin with small yellowish scabs. When the scabs have fallen off, the integument takes on an erythematous and smooth appearance. The skin's surface cracks and is covered with fine scales. This is the scaling phase. In certain cases, the opening of the vesicles causes the dermis to be exposed.

Although general antibiotic therapy is sometimes indicated in cases of superinfection, most eczemas are treated topically with prescribed antiseptic baths and local corticosteroid therapy, accompanied by a moisturizing cream to treat dry skin, which is a recurrent symptom of these dermatoses. Antibiotics and antiseptics can slow the colonization of pathogens, but do not replenish the microbiota. Moreover, oral antihistamines may be necessary in certain cases to calm the itching. However, the use of dermocorticoids is not without side effects: they can atrophy the epidermis and dermis and trigger acne or perioral dermatitis. It is therefore advisable to propose an alternative treatment for atopic dermatitis without prescribing dermocorticoids.

In the conventional treatments prescribed from the erythematous phase of atopic dermatitis, the use of antiseptics in aqueous or alcoholic solution is followed by the application of dermocorticoid-based products. Moreover, people susceptible to allergies are very frequently intolerant to irritating substances such as preservatives, for example. Conventional treatments are therefore potentially irritating and allergenic and require daily applications. Dupixent is an alternative treatment administered only twice a month, but it must be injected and is expensive.

It is therefore desirable to have a product for the topical treatment of eczema that has at least one of the following advantages: be less expensive, be free of irritants such as preservatives, be free of dermocorticoids, and be less restrictive to apply.

The use of biological material has been proposed as an alternative to drug treatments for eczema and other dermatoses such as rosacea and dandruff. Bacterial extracts or molecules synthesized by bacteria have been incorporated into creams or lotions to stimulate the metabolism of certain bacteria of the altered resident microbiota, or to combat exogenous or resident pathogenic bacteria that have acquired pathogenicity. Four examples of this type of treatment can be given. The first relates to extracts of non-photosynthetic and non-fruiting filamentous bacteria introduced into creams to increase the diversity of the resident skin flora (FR 2 918 886 and FR 2 918 884). The second relates to anti-aging cosmetic products comprising *Lactobacillus* and *Bifidobacterium* probiotic bacteria that stimulate the existing flora. The addition, in these dermatological products, of active molecules naturally produced by a healthy microbiota to stimulate the production of antimicrobial peptides by atopic skin against pathogens is a third example of a dermatosis treatment using biological material. Finally, the incorporation of prebiotics to nourish the resident bacterial flora is a fourth example. Nevertheless, there remains a need to improve the efficacy of such treatments.

The present invention implements a gel comprising water, glycerin, at least one crosslinked polyacrylate, and optionally a polyol different from glycerin, preferably a diol. One such gel has already been proposed for the healing treatment of various skin conditions in application WO 2012/136934. In the case of eczema, the healing effect of the gel on dermal lesions that have formed in the vesicular stage of the disease has been reported. There remains a need for an effective treatment for eczema at an earlier stage of the disease.

SUMMARY OF THE DISCLOSURE

The invention relates to a cosmetic product or pharmaceutical product for the topical treatment of dysbiosis, said product having a pH between 5.5 and 6.5 and comprising essentially water, glycerol, at least one crosslinked polyacrylate and at least one polyol different from glycerol. In an embodiment, the product comprises at least 90% by mass of water, glycerol, at least one crosslinked polyacrylate, a polyethylene glycol and 1,2-octanediol. Advantageously, the product restores the skin microbiota of healthy skin by joint action of a biological material transplantation composition.

Depending on the kind of dysbiosis, particularly its nature, intensity or stage, the product may have either a cosmetic action, i.e., improve the appearance of the skin and/or the person's feeling of comfort when the dysbiosis is non-pathological in nature, or a pharmaceutical action, i.e., treat diseased skin when the dysbiosis is pathological in nature. Dysbiosis is not necessarily a disease, and the product is a pharmaceutical product only when it has a therapeutic action and is intended to treat pathological skin conditions. A cosmetic product does not have pharmaceutical activity. Such treatment may include a first step of applying the product to the skin, followed by a second step of cleansing said product after leaving it to act for a sufficient time. In a third step, a composition comprising biological material in a sufficient amount to rebalance the microbiota and sanitize the skin can be applied to the skin. The product is used for example for the treatment of atopic dermatitis.

It was surprisingly discovered that the product in accordance with the invention makes it possible to optimize the treatment of a dermatosis by providing biological material, for example by microbiota transplantation, with a view to restoring a healthy skin microbiota. The product of the invention advantageously makes it possible to reduce or even eliminate the use of antiseptics and steroid creams, which are nevertheless necessary in the prior art to treat skin inflammations.

The term "skin microbiota" is understood to mean the microbial flora that is mainly found on the skin's surface but can also be found in the hair follicles, sebaceous glands, sweat glands and dermis. This resident skin flora comprises a group of microorganisms including bacteria, yeasts, fungi and viruses. So-called commensal bacteria protect the host against infections triggered by the colonization of pathogenic microorganisms. The relative frequencies of the different species of microorganisms vary from one individual to another. In the same individual, it evolves notably with age, diet, pH, humidity level and lipid composition of the skin, the anatomical area of the skin, body temperature, mechanical and chemical insults to which the skin is exposed, climatic conditions to which the skin is exposed, and drug treatments administered to the individual. The microbiota of healthy skin in the sense of the invention is defined as that of a given skin area: it is stable over time for a given person not suffering from a dermatosis. The skin microbiome encompasses the microbiota, its genes and its mode of operation. The microbiome of healthy skin protects against invasive pathogens, but also against skin dryness.

The so-called commensal bacteria colonize the skin without being pathogenic and protect it. They can only live in contact with the host, feed on dead organic matter and participate in its degradation. So-called saprophytic bacteria live at the expense of the host, do not cause disease in a healthy subject but can become pathogenic in an immunocompromised subject. The same bacterium can be commensal, saprophytic and pathogenic at the same time.

Commensal bacteria protect the host against colonization by pathogenic bacteria or bacteria that have become pathogenic by secreting bacteriocins. They compete with invasive bacteria for nutrients. In the sense of the invention, the commensal bacteria of a healthy microbiota or of an altered, disturbed or unbalanced microbiota include in particular *Staphylococcus epidermidis, Staphylococcus hominis* (predominant commensal bacteria), *Streptococcus mitis, Propionibacterium acnes, Corynebacterium* species, *Acinetobacter johnsoni* (frequent commensal bacteria), and *Staphylococcus warneri* (infrequent commensals). Other bacteria are also part of these microbiota, such as *Staphylococcus haemolyticus, Staphylococcus aureus, Corynebacterium lipophilic, Corynebacterium urealyticum, Corynebacterium minutissimum, Corynebacterium jeikeium, Propionibacterium avidum, Propionibacterium granulosum, Propionibacterium propionicum, Micrococcus luteus, Micrococcus varians, Streptococcus* of groups A, B and G, and bacteria of the genus *Brevibacterium*.

Dysbiosis is understood to mean an abnormality in the bacterial composition of the microbiota, or an imbalance, alteration or disruption in the functioning of the skin microbiota. Dysbiosis can result from an increase or decrease in bacterial diversity, an increase or decrease in a colony of resident bacterial species, or the emergence of a pathogenic bacterial colony, for example. Dysbiosis can be a pathology or a disorder that alters the aesthetics and comfort of the affected person but is not pathological in nature. An increase or reduction in bacterial diversity can promote the emergence of pathogenic bacteria and the development of inflammatory skin diseases.

DETAILED DESCRIPTION OF THE PREFERRED EMBODIMENTS

The subject matter of the invention is a pharmaceutical product for use in topical treatment of an area of skin of a person suffering from dysbiosis, said treatment comprising:

a first step of applying the product to the skin area, said product being free of preservative, having a pH between 5.5 and 6.5 and comprising at least 90% by mass of a mixture consisting of water, glycerol, at least one crosslinked polyacrylate, and at least one polyol different from glycerol, a second step of cleaning the skin area so as to remove the product that was applied in the previous step, a third step of transplanting, onto the cleaned skin area, a bacterial transplantation composition comprising at least one biological material selected from the group consisting of a bacterium, an extract of a bacterium or an extract of a culture medium of a bacterium.

The present application further describes the use of a cosmetic product for improving the appearance of an area of skin exhibiting a state of dysbiosis not resulting in any pathological symptoms, said product being free of preservative, having a pH between 5.5 and 6.5 and comprising at least 90% by mass of a mixture consisting of water, glycerol, at least one crosslinked polyacrylate, and at least one polyol different from glycerol.

In a particular embodiment, the product comprises at least 90% by mass of a mixture consisting of water, glycerol, at least one crosslinked polyacrylate, at least one polyethylene glycol and 1,2-octanediol. The product preferably comprises said mixture in a minimum amount greater than or equal to a value selected from the group consisting of 90%, 95%, 96%, 97%, 98%, 99%, 99.5% and 99.9% by mass. The product preferably consists of this mixture.

In an embodiment, the product contains less than 5% by mass of biological material selected from the group consisting of a bacterium, an extract of a bacterium or an extract of a culture medium of a bacterium. The product preferably contains an amount of biological material less than a value selected from the group consisting of 5%, 4%, 3%, 2%, 1%, 0.5%, 0.1%, 0.05% and 0.01% by mass. The product is preferably free of any biological material. The invention also relates to a separately packaged set of a product and a composition for use in the topical treatment of an area of skin of a person suffering from dysbiosis, said product being free of preservative, having a pH between 5.5 and 6.5 and comprising at least 90% by mass of a mixture consisting of water, glycerol, at least one crosslinked polyacrylate, and at least one polyol different from glycerol, and said composition being a bacterial transplantation composition comprising at least one biological material selected from the group consisting of a bacterium, an extract of a bacterium or an extract of a culture medium of a bacterium.

The product or set of the invention is used for the treatment of a disorder or disease associated with dysbiosis, i.e., associated with an imbalance of the skin microbiota. The imbalance can be expressed by an effect selected from the group consisting of a decrease in the number of bacterial species, an increase in the population of at least one pathogen, a decrease in the population of at least one commensal bacterium, an increase in the population of at least one commensal bacterium, a transition from a commensal character to a pathogenic character of a bacterium.

Dysbiosis results from a change in the composition and/or functioning of the microbiota that can be both qualitative and quantitative. Dysbiosis can be expressed by a decrease in the diversity of resident bacterial species that make up the microbiota. Dysbiosis can also result from the appearance or increase of a colony of a pathogenic microorganism that triggers or aggravates a dermatosis. Finally, dysbiosis can result from the abnormal proliferation of an endogenous strain of the resident microbiota.

Dysbiosis can result from a decrease or an increase in the bacterial diversity of the initial skin microbiota, i.e., not disturbed by dysbiosis. Dysbiosis can also result from a decrease or an increase of a bacterial colony, for example a colony of commensal bacteria of the initial microbiota, or a colony of an exogenous pathogenic bacterium.

The dysbiosis is preferably a pathology that damages only the epidermis and does not generate dermal lesions. The term "epidermis" refers to the superficial, non-vascular layer of the skin, which varies in thickness from 50 to 120 microns on average and comprises four continuous layers resulting from keratinocyte differentiation: a basal layer, a spinous layer, a granular layer and a horny layer.

The dysbiosis may be associated with more or less significant skin dryness, which the product or set of the invention reduces significantly in certain embodiments. It is known from the prior art that the horny layer plays a primary role in maintaining the degree of hydration of the skin. On the one hand, water is bound to intracellular hygroscopic substances (natural moisturizing factors, or NMFs) that are formed during keratinization: NMFs participate in the static hydration of the epidermis. On the other hand, extracellular lipids limit the permeability of the skin and water loss. Finally, water from the blood capillaries naturally migrates to the skin's surface for hydration. Moisturizers of the prior art adopt two complementary strategies to take the first two mechanisms into account. The skin hydration provided by these care products is a surface hydration, generated thanks to hydrophilic substances capable of retaining water (humectants) and to lipophilic compounds for limiting water loss (occlusives).

It has now been surprisingly discovered that the product of the invention or the set of the invention is much more effective than a moisturizing product of the prior art acting only on the level of surface hydration of the skin. The product of the invention or the set of the invention reinforces the natural and physiological process of hydration of the skin by accelerating or intensifying the rise of water contained in the blood capillaries towards the dermis and the epidermis. The product of the invention or the set of the invention can advantageously constitute a tissue moisturizing product and not a surface moisturizing product. Advantageously, it provides a moisturizing effect superior to that obtained in the prior art without using humectants and occlusive fatty compounds which limit water loss, but without actually providing any.

The dysbiosis can be a dermatosis selected from the group consisting of rosacea, psoriasis, eczema, hidradenitis suppurativa, pityriasis, dandruff and acne. These pathologies can be accompanied by more or less severe symptoms of dry skin.

The product of the invention or the set of the invention also reduces the risk of occurrence of complications of dysbiosis which are essentially of infectious origin. The complications observed in the prior art generally result from microbial or viral superinfections (triggering of a herpes) or the appearance of a mycosis.

The dysbiosis may be an eczema. Eczema, in the sense of the invention, is understood to be a set of pruritic erythematous vesicular dermatoses comprising layers of elementary epidermal lesions that most often evolve into dermal lesions. The erythema is most often accompanied by microvesicles filled with clear fluid. The dysbiosis can be chronic eczema or contact eczema. The pathology evolving chronically or being triggered by contact can be localized on one or several particular areas of the body such as the face or the limbs. Chronic eczema can present several degrees of severity: for example, in the dry form, the skin is covered with red, scabrous patches and its level of scaling is variable. In a more severe form, lichenified or keratotic eczema results in a thickening of the horny layer and the formation of cracks.

The eczema can be an atopic dermatitis, a dry eczema, a lichenified eczema, a keratotic eczema or a dyshidrotic eczema. In the case of eczema, particularly atopic dermatitis, the treatment is advantageously applied at least at the initial stage of the evolution of the disease, called the erythematous stage. The treatment makes it possible to avoid the progression of the disease at a later stage, and in particular the formation of dermal lesions often formed by patients who scratch themselves to calm the itch. Surprisingly, the inventor found that the product can be used to effectively treat the disease well before the vesicular phase, which had never been proposed before.

Atopic dermatitis, the most common form of eczema, can evolve in a chronic mode or in recurrent flare-ups. It occurs mainly in patients genetically predisposed to increased synthesis of immunoglobulin E (IgE). A distinction is made between atopic dermatitis in infants and in children. In infants, the eczema is pruritic, erythematous and scabrous. The forehead and cheeks are affected first. The rash may then spread to the ears and scalp. In children from 3 years of age, lichenified, pruritic, rarely weeping patches predominate on the elbow folds. After puberty, eczema disappears permanently in 90% of cases. Atopic dermatitis can be more or less severe depending on the intensity and extent of the lesions, the intensity of itching and the impact on quality of life. Skilled persons will know how to perform a multifactorial evaluation according to their general knowledge to define whether the patient's atopic dermatitis is mild, moderate or severe. Various scales are used by physicians to assess this severity, including SCORAD (Scoring Atopic Dermatitis), EASI (Eczema Area and Severity Index) and DLQI (Dermatology Life Quality Index).

In a particular embodiment, the dysbiosis is atopic dermatitis in the erythematous stage.

The imbalance of the skin microbiota may result from the presence or predominance of at least *Staphylococcus aureus, Propionibacterium acnes, Malassezia* or *Demodex*. For example, dysbiosis may be acne in which the strains of *Propionibacterium acnes* found on the person's skin area are distinct from those found in a healthy individual. Dysbiosis can also be acne resulting from the presence of *Propionibacterium granulosum*. Atopic dermatitis can be characterized by a decrease in bacterial diversity and, consequently, colonization of the skin area by *Staphylococcus aureus*. Rosacea may be accompanied by an increase in the *Demodex* mite population.

The area of skin affected by dysbiosis can be the skin of the body, face, neck, eye area or scalp. The area of skin affected by the treatment will preferably be the skin of the face or neck.

The product preferably has a pH below 6.5, in particular to preserve the secretion of bacteriocins by commensal bacteria in the skin area to which the product is applied and, consequently, to limit or even prevent the development of certain pathogens.

The pH of the product of the invention preferably ranges from 5.5 to 6.5 and may be of the order of 6.0 or equal to 6.0 (within measurement uncertainties at 20° C.).

It contains very small amounts or is free of chemical preservative(s) such as parabens which may block the replenishment of commensal bacteria and cause an allergy in the person. "Very small amounts" means an amount lower than the usual amount, specific to each preservative, and known to the skilled person. A preservative in the sense of the present invention is a synthetic chemical product with biocidal properties, for example ethanol, phenoxyethanol, parabens.

The product preferably comprises at least 90% by mass of a mixture consisting of water, glycerol, at least one crosslinked polyacrylate and at least one polyol different from glycerol. The product can be made, for example, by suspending the crosslinked polyacrylate in a mixture of water and polyols (including glycerin).

The mixture may contain at least one polyol different from glycerin selected from the group consisting of 1,2-alkanediols comprising from 5 to 12 carbon atoms, preferably from 8 to 10 carbon atoms, for example 1,2-octanediol. The alkanediol preferably represents 0.01% to 10%, preferably 2% to 8% by mass of the product. Other polyols are for example propylene glycol, 1,3-butylene glycol, 1,8-octanediol, 1,2-pentanediol, mannitol or sorbitol.

The mass ratio of glycerin to 1,2-octanediol is preferably comprised between 5:1 and 15:1, more preferably between 8:1 and 10:1. The polyol different from glycerol may be a polyethylene glycol or 1,2-octanediol.

According to an alternative, the product of the invention consists solely of water, glycerol, at least one crosslinked polyacrylate polymer, at least one polyethylene glycol with a molecular weight of less than 1000 g/mol and 1,2-octanediol. The polyethylene glycol preferably has a molecular mass ranging from 100 to 1000 g/mol, preferably ranging from 200 to 600 g/mol. It may represent from 0.05% to 1.0%, preferably from 0.5% to 5% by mass, and more preferably from 1% to 5% by mass of the product. The product may contain from 0.1% to 1.5% by mass, preferably from 0.5% to 1.5% by mass of 1,2-octanediol.

In an embodiment, the product of the invention consists of water, from 5% to 25% by mass, preferably from 5% to 15% by mass, of glycerol, from 0.01% to 2% by mass of crosslinked polyacrylate; from 0.05% to 1.0% by mass, preferably 0.5% to 5% by mass, and more preferably 1% to 5% by mass, of a polyethylene glycol, and 0.1% to 1.5% by mass, preferably 0.5% to 1.5% by mass of 1,2-octanediol.

The crosslinked polyacrylate may be a compound with the INCI name carbomer and have one of the following CAS numbers: 9007-20-9, 9003-01-4, 76050-42-5, 9062-04-8, 9007-16-3 or 9007-17-4. The crosslinked polyacrylate is preferably a homopolymer of acrylic acid crosslinked with an allyl ether of pentaerythritol or an allyl ether of sucrose. It is preferred that the crosslinking rate of the polymer is high.

The crosslinked polyacrylate may be substituted, in certain embodiments, with a polyacrylic acid, a polymethacrylic acid, a copolymer of methacrylic acid and acrylic acid, a salt of any of these acids obtained by neutralization with a base, an ester of any of these acids, or a crosslinked compound obtained from these acids.

The water preferably represents from 5% to 60% by mass, preferably from 10% to 50% by mass and even more preferably from 30% to 50% by mass of the mass of the product. The proportion of glycerine can range from 3% to 80% by mass, preferably from 4% to 70% by mass of the mass of the product. The crosslinked polyacrylate can represent from 0.01% to 2% by mass of the mass of the product, for example from 0.01% to 0.4% by mass of the mass of the product.

The product may be in the form of a lotion, a gel, an oil-in-water or water-in-oil emulsion, gels, ointments, sprays or poultices. The product of the present invention is preferably in gel or hydrogel form. The product may comprise a water-insoluble support, said support may be impregnated with the product. The support is, for example, a non-woven textile, knitted fabric or gauze. The support may be cut to the shape of the area of the skin to be treated; for example, the support is in the shape of a face mask. Alternatively, the product does not include a support and is applied to the area of skin before being covered with a support.

The product may also comprise any active compound known to the skilled person which may have a beneficial effect on the treatment of the disease to be treated, this active compound not being a biological material selected from the group consisting of a bacterium, an extract of a bacterium or an extract of a culture medium of a bacterium. The product of the invention may contain at least one active agent selected from the group consisting of moisturizing agents and molecules acting on fibroblast and keratinocyte activation, in particular active agents stimulating the secretion of antibacterial peptides by keratinocytes.

In an embodiment, the product is advantageously free of any dermatological active agent and any chemical preservative. Preferably, the product is free of any corticoid compound and/or any antihistamine.

The first step of applying the product to the skin is preferably done in a thick layer for a period of 30 min. In a particular embodiment, the product of the invention is applied to the skin to form a thick layer, for example a layer of thickness ranging from 2 to 3 mm. The layer of product may be covered with a sterile gauze cloth. The product is preferably left to act for a time equal to at least 10 minutes, preferably at least 20 minutes, and more preferably at least 30 minutes.

At the end of this product application step, the product layer and the gauze cloth—when the latter has been used— are preferably removed. The product can be removed, for example, with a sterile gauze cloth by wiping.

The cleaning step can be performed by wiping or washing the skin area with a neutral lotion.

The product of the invention is used to prepare the skin for the application of a bacterial transplantation composition comprising at least one biological material selected from the group consisting of a bacterium, an extract of a bacterium or an extract of a culture medium of a bacterium.

In an embodiment, the product of the invention can be used as part of a cosmetic treatment or a dermatological treatment comprising a step of transplanting a microbiota or a fraction of microbiota, which is performed separately and after a step of removing the product by cleaning. The step of transplanting a microbiota is preferably performed as soon as the step of removing the product is completed. In the context of the treatment of a person suffering from dysbiosis, the frequency of application of the product followed by a transplantation step will preferably be at least once a week for at least one month.

The transplantation step preferably comprises a step of preparing a solution or dispersion containing a biological material, for example a commensal bacterium of a care microbiota. The solution or dispersion is preferably prepared from a freeze-dried composition. Said composition may take the form of a powder or a tablet.

Transplantation of the microbiota can be performed by applying to the cleansed skin a solution or dispersion obtained by dissolving a freeze-dried microorganism in a preferably sterile liquid medium. The solution or dispersion is preferably prepared just before the skin transplantation step.

The liquid medium comprises or consists of water, which may be mineral water, spring water or saline. The pH of the medium preferably ranges from 5.5 to 6.5, for example is equal to 6. The liquid medium may be in the form of an emulsion of a fatty phase and an aqueous phase. It is preferred that the liquid medium is free of any chemical preservatives.

The biological material can be an extract of a bacterium, for example a lysate of a probiotic bacterium of a healthy microbiota, or a bacterium, for example a commensal bacterium of a healthy microbiota.

As biological material, mention may be made of microorganisms such as *Staphylococcus epidermis, Staphylococcus haemolyticus, Staphylococcus homonis, Staphylococcus similans, Corynebacterium lipophilus, Corynebacterium jeikeium, Corynebacterium urealyticum, Corynebacterium minutissimum, Propionobacter granulosum, Propionobacter avidum, Micrococcus luteus, Micrococcus varians, Streptococcus* A, *Streptococcus* C and *Streptococcus* G, *Roseomonas mucosa* and *Brevibacterium* species.

The microbial transplantation composition may comprise a probiotic as biological material. Such a probiotic may be selected from microorganisms in living, dormant or inactivated form, a metabolite thereof or a fragment thereof. The probiotic may be selected from bacteria of the species *Lactobacillus* and *Bifidobacterium*, and yeasts of the species *Saccharomyces*. It will preferably be in freeze-dried form.

The biological material of the microbial transplantation composition may comprise at least one non-photosynthetic filamentous bacterium or an extract thereof. The filamentous bacterium may be a bacterium of the genus selected from the group consisting of *Beggiatoa, Flexithix, Leucothrix, Sphaerotilus* or *Vitreoscilla*, for example *Vitreoscilla filiformis* (ATCC 15551), *Itreoscilla beggiatoides* (ATCC 43181), *Beggiatoa alba* (ATCC 33555), *Flexithrix dorotheae* (ATCC 23163), *Leucothrix mucor* (ATCC 25107) or *Sphaerotilus natans* (ATCC 13338). An extract of these bacteria may refer to the supernatant of the fermentation medium of said bacteria, the envelope or an envelope fraction of said bacteria, the biomass obtained by culturing said bacteria, an extract obtained by processing said biomass and mixtures of these derivatives, for example a lysate of bacteria in its culture medium.

The microbial transplantation composition may also comprise at least one prebiotic as biological material and as an extract of a culture medium of a bacterium. Prebiotics are known to the person skilled in the art and are used to stimulate the growth or activity of the commensal microorganism(s) of the microorganism composition. It is preferred that the prebiotic is not metabolizable by the microorganisms responsible for the disease to be treated. The prebiotic may be selected from oligosaccharides and polysaccharides comprising from 2 to 100 monosaccharide units. It can be, for example, selected from glucose, galactose, xylose, maltose, lactose, a starch, a xylan, a hemicellulose and an inulin.

The composition may further comprise any cosmetic or pharmaceutical excipient known to the person skilled in the art.

The invention also relates to a set of a product and a composition for use in the treatment of dysbiosis, the product and the microbial transplantation composition being as previously described and being separately packaged within a single packaging unit. The product and the composition are preferably intended for sequential and separate application, the product being intended to be applied to an area of skin in a first step, which is followed by a second step consisting in applying the composition to the same area of skin.

Thus, the invention relates to a combination for use in the treatment of dysbiosis, which combination is in the form of a combination product comprising at least: a) an effective amount of a preservative-free gel having a pH between 5.5 and 6.5 and comprising at least 90% by mass of a mixture of water, glycerol, at least one crosslinked polyacrylate, and at least one polyol different from glycerol, and b) an effective amount of a biological material, said gel and said biological material being used sequentially and separated in time.

The features of the gel and the biological material forming part of the above-mentioned set or combination are identical to the features that were described earlier in the description in connection with the preservative-free product and the set of this product and a bacterial transplantation composition, and as a result their description is not reproduced a second time in this section.

In the context of the invention, the gel and the biological material are not part of the same composition and do not form the same product, so much that they are not applied simultaneously to an area of skin affected by pathological dysbiosis or non-pathological dysbiosis. The inventor has surprisingly demonstrated that administration of the gel to an area of skin, followed by administration after a period of time ranging from, for example, a few minutes to a few hours, of a biological material to the same area of skin, treats pathological dysbiosis and non-pathological dysbiosis. It is preferred that the gel be removed from the surface of the skin area, for example by wiping, before administering the biological material. The time between the application of the gel and the subsequent application of the biological material to the affected area of skin preferably ranges from 5 minutes to 1 hour, preferably from 10 minutes to 50 minutes and more preferably from 20 minutes to 40 minutes. The wiping is carried out under sterile conditions, so as to avoid any contamination of the skin by microbes, so that the skin—cleaned and free of any microbial flora on the surface—can receive exogenous biological material capable of regenerating a bacterial flora on the surface of the skin allowing its normal biological functioning.

The microbial transplantation composition is preferably in freeze-dried form in the set. The set may in this case also comprise a third product which is in fluid form and which may be used to dissolve or disperse the microbial transplantation composition when the latter is in freeze-dried form.

The product of the invention can be used in the context of a cosmetic care method for a subject wishing to improve the aesthetics and/or comfort of his or her skin not affected by a pathology. The product can be used to rebalance, control, maintain or modulate the skin microbiota of healthy skin when it is occasionally disturbed by a chemical or physical trigger, such as unusual exposure to UV, heat or a toxic chemical agent. The cosmetic care method is not applicable to a subject in whom the balance and/or function of the skin microbiota is chronically disrupted and in whom the change in microbiota triggers a disease.

Finally, the present application relates to the use of a product as described above to improve the efficacy of a composition comprising biological material, in the topical treatment of an area of skin affected by dysbiosis.

The invention is illustrated by the following example.

EXAMPLE

Clinical Study for the Treatment of Atopic Dermatitis

A study is conducted on adults aged 18-55 years with moderate atopic dermatitis (SCORAD 25-50) in the erythematous stage. Three groups of 10 people are randomly assigned, and each group undergoes one of three described treatments.

Products Applied

A commercially available gel under the brand name Osmosoft® was applied to the face and neck of 10 people in the first group twice a day for 15 days. A commercially available product containing 5% of a *Vitreoscilla filiformis* bacterial autolysate is applied under the same conditions to the face and neck of 10 other people in the second group with the same symptoms, twice a day for 15 days.

On the 10 people of the third group, the protocol consisting in applying successively the gel and the product of the prior art, both of them conforming to those used in the two previous trials, is followed. Twice a day for 15 days, 10 people are treated as follows: the gel is applied as a poultice for 30 minutes. It is then removed by cleaning with a sterile compress. The product of the prior art is then applied to the same areas.

Evaluation Criteria

Three criteria for remission are assessed.

Decrease in skin dryness (tightness, redness, roughness, scaling, cracking) of dermatitis areas is clinically assessed by a dermatologist before the start of treatment and on the last day of treatment.

Reduction of itching is assessed on the basis of patient reports according to the numerical pruritus rating scale (NRS). Each patient was asked, "On a scale of 0 to 10, with 0 being 'no itching' and 10 being 'worst itching imaginable,' how would you rate your itching at the worst moment in the past 24 hours?" The average of the scores from the day before the start of treatment and the average of the scores from the end of treatment are then calculated for each of the three groups. The difference between the average pre-treatment score and the average post-treatment score reduced to the average pre-treatment score is used to calculate the average percentage decrease in itching for each group.

Skin hydration was measured with a CM 825 Corneometer within 7 hours of gel application. The increase in hydration is calculated as a percentage after treatment.

Results 3-1 Dermatological Tests

The results are presented in Table 1.

TABLE 1

| Percentage of change from the initial state | Prior art product no. 1 | Prior art product no. 2 | Invention |
|---|---|---|---|
| Skin dryness | −70% | −65% | −80% |
| Itching | −75% | −55% | −85% |

There appears to be a significant reduction (p<0.03) in skin dryness and itching in subjects treated with the product of the invention.

3-2 Hydration tests

The results are presented in Table 2.

TABLE 2

| Time (hours) | Invention | Prior art product no. 1 | Prior art product no. 2 |
|---|---|---|---|
| | | Percentage increase (%) | |
| 1 | 80 | 70 | 55 |
| 2 | 78 | 65 | 50 |
| 3 | 76 | 60 | 45 |
| 4 | 74 | 57 | 42 |
| 5 | 72 | 57 | 40 |
| 6 | 70 | 56 | 38 |
| 7 | 74 | 55 | 36 |

The skin's moisture status is improved by the treatment of the invention.

The invention claimed is:

1. A method for the topical treatment of an area of skin of a person suffering from dysbiosis, said person having an initial healthy skin microbiota before suffering from dysbiosis, said method comprising in sequence:
    a step of applying, on the area of skin, a product having a pH between 5.5 and 6.5 and comprising at least 90% by mass of a mixture consisting of water, glycerol, at least one crosslinked polyacrylate, and at least one polyol different from glycerol, and
    a step of cleansing said product in order to remove the product after leaving the product to act for a sufficient time,
    a step of applying, on the area of skin to which the product was applied, a composition being a healthy skin microbiota transplantation composition comprising at least one biological material selected from the group consisting of a bacterium, an extract of a bacterium or an extract of a culture medium of a bacterium,
    wherein the product is free of any biological material, and
    wherein a time period between the step of applying the product and the step of applying the composition is in a range of from 5 minutes to 1 hour.

2. The method as claimed in claim 1, wherein the extract of a bacterium is a lysate of a probiotic bacterium of a healthy type skin microbiota.

3. The method as claimed in claim 1, wherein the bacterium is a commensal bacterium of a healthy type skin microbiota.

4. The method as claimed in claim 1, wherein the polyol is polyethylene glycol or 1,2-octanediol.

5. The method as claimed in claim 1, wherein the dysbiosis results from a decrease or increase in the bacterial diversity of the person's initial healthy skin microbiota.

6. The method as claimed in claim 1, wherein the dysbiosis results from a decrease or increase in a bacterial colony of the person's initial healthy skin microbiota, or a bacterial colony of an exogenous pathogenic bacterium.

7. The method as claimed in claim 6, wherein the bacterial colony is a commensal bacterial colony of the person's initial healthy skin microbiota.

8. The method as claimed in claim 6, wherein the bacterial colony is a bacterial colony of an exogenous pathogenic bacterium.

9. The method as claimed in claim 1, wherein the dysbiosis is a dermatosis selected from the group consisting of rosacea, psoriasis, eczema, hidradenitis suppurativa, pityriasis, dandruff and acne.

10. The method as claimed in claim 9, wherein the dermatosis is atopic dermatitis in the erythematous stage.

11. The method as claimed in claim 1, wherein the biological material is selected from the group consisting of *Staphylococcus epidermis, Staphylococcus haemolyticus, Staphylococcus homonis, Staphylococcus similans, Corynebacterium lipophilic, Corynebacterium jeikeium, Corynebacterium urealyticum, Corynebacterium minutissimum, Propionobacter granulosum, Propionobacter avidum, Micrococcus luteus, Micrococcus varians, Streptococcus* A, *Streptococcus* C and *Streptococcus* G, *Roseomonas mucosa* and *Brevibacterium*.

12. The method as claimed in claim 1, wherein the product further comprises a water-insoluble support.

13. The method as claimed in claim 12, wherein the water-insoluble support is in the form of a face mask.

14. The method as claimed in claim 1, wherein the product further comprises at least one polyethylene glycol and 1,2-octanediol, and wherein the water, glycerol, at least one crosslinked polyacrylate, at least one polyethylene glycol and 1,2-octanediol combined make up at least 95% by mass of the total mass of the product.

15. The method of claim 1, wherein the second step of cleansing comprises wiping the skin area with a neutral lotion.

16. The method of claim 1, wherein the second step of cleansing comprises washing the skin area with a neutral lotion.

17. The method of claim 1, wherein a sterile gauze is applied after the product; and wherein the product is allowed to act for a time period of at least 10 minutes prior to removal of the gauze.

18. The method of claim 1, wherein the time period between the step of applying the product and the step of applying the composition is in a range of from 20 minutes to 40 minutes.

19. The method of claim 1, wherein the product does not comprise a preservative.

20. The method of claim 4, wherein the polyol is 1,2-octanediol.

* * * * *